3,580,869
MICROCELLULAR POLYURETHANE FOAMS BASED ON AROMATIC POLYAMINES AND PROPOXYLATED ANILINE

Richard D. Rhodes, Jr., Somersworth, and Kirby E. L. Flanagan, Rochester, N.H., assignors to Davidson Rubber Company Inc., Dover, N.H.
No Drawing. Continuation-in-part of application Ser. No. 733,765, June 3, 1968. This application June 3, 1969, Ser. No. 830,095
Int. Cl. C08g 22/46
U.S. Cl. 260—2.5    2 Claims

ABSTRACT OF THE DISCLOSURE

A microcellular polyurethane foam prepared by reacting in the presence of an organometallic catalyst:
(1) toluene diisocyanate;
(2) a polyol selected from the group consisting of:
  (A) organic triols having molecular weights of from about 1,500 to about 6,500 and
  (B) mixtures of (I) organic triols having molecular weights of from about 1,500 to about 6,500 and (II) organic diols having molecular weights of from about 400 to about 2,800;
(3) an aromatic amine having the formula:

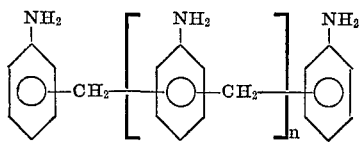

where $n$ equals from about 0.1 to about 0.3; and
(4) a propoxylated aniline having the formula:

N[CH$_2$—CH(CH$_3$)OH]$_2$

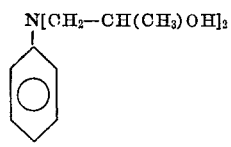

proportions of (1) to (2) to (3) to (4) being such that:
  (a) the ratio of —NCO to active hydrogen atoms is in the range of from 1.0:1.0 to 1.2:1.0;
  (b) the ratio of —NH$_2$ groups of the aromatic amine to —OH groups is in the range of from 0.6:1.0 to 1.0:1.0; and
  (c) the weight ratio of aromatic amine to the sum of aromatic amine and propoxylated aniline is from 0.45:1.0 to 0.95:1.0.

RELATIONSHIP TO OTHER APPLICATION

This is a continuation-in-part application of co-pending application entitled "Urethane Formulation for the Production of Microcellular Foams," Ser. No. 733,765, filed June 3, 1968, now abandoned.

BACKGROUND OF THE INVENTION

In the past few years the automotive industry has begun to produce crash pads, arm rests, bumpers, pillar posts and the like out of microcellular urethane foams. Microcellular foams are characterized by their continuous integral skin which is formed by the urethane itself; thus, eliminating the application of a separately formed vinyl shell or skin to cover and protect the foamed urethane. The microcellular urethane foams are stronger and tougher than other types of urethane foams, but lighter and less costly per unit volume than solid urethanes. The formation of microcellular foams is complicated and involves a delicate balance of gas formation, chemical and physical changes of polymerization, nucleation, and rheology of the polymer system. As the chemical reaction between the components of the foam compositions begins, polymer viscosity and modulus build-up must be sufficient to trap individual gas bubbles, causing the material to foam while preventing the bubbles from rupturing if a closed cell foam is desired. If an open cell foam is desired, the bubbles must be allowed to burst forming an interconnecting network. If the viscosity-modulus build-up is too slow, the cell walls exhibit insufficient extensibility and the bubbles rupture forming open cell materials or materials of low density. If the reactions progress too rapidly, pressure created by the evolving gases can cause splitting of the foamed material or undesirably high densities.

The open cell microcellular foams are generally resilient and are employed to produce foams for use in fabricating interior parts such as crash pads, arm rests, pillar posts and the like. The closed cell foams or those foams having a large proportion of closed cells are generally more dense and less resilient than the open cell foams. The high density foams, i.e., those having a density of from about 30 to 60 pounds per cubic foot, are used for the production of bumpers, shock absorbers and other exterior parts.

In the production of automobile components such as microcellular bumpers, crash pads, arm rests, pillar posts and the like, it is important that the viscosity of the foamable urethane formulation is low enough that it will distribute evenly within the mold thereby preventing serious imperfections caused by the entrapment of gas within the mold during the foaming operation. This tendency to trap gas within the mold is particularly acute in molds having complex shapes. It is an advantage of the urethane formulations of the present invention that they exhibit the desired flow characteristics. It is a further advantage of the present invention that the integral skin formed during the foaming operation is of sufficient thickness to provide a durable surface which can be painted or colored. A thick skin will also be important in providing the desired strength and surface protection. It is still a further advantage of the microcellular foams produced from the foamable composition of the present invention that they are fire resistant.

PRIOR ART

The production of microcellular or self-skinned foams is not unique; microcellular foam compositions employing 4,4'-methylene bis(2-chloroaniline) (MOCA—E. I. du Pont de Nemours & Co., Inc.) are well known. However, the microcellular foams produced from the urethane formulations of the present invention have lower sets, lower viscosity at pour and thicker skins than foamed materials produced from MOCA based formulations. Furthermore, the foamed materials of the present invention are softer per given density than the MOCA containing foams.

DETAILED DESCRIPTION OF THE PRESENT INVENTION

The present invention is directed to urethane formulation for the production of microcellular foams; said urethane formulation comprised of a polyol, toluene diisocyanate, an aromatic amine corresponding to the formula

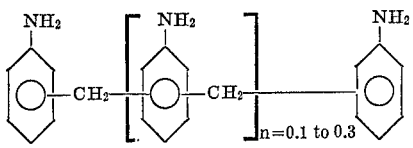

and a propoxylated aniline, N,N-(2-hydroxypropyl)aniline, corresponding to the formula

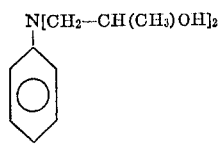

The microcellular foam composition of the present invention can be employed in "one-shot," quasi-prepolymer or prepolymer processes to produce microcellular foams having a density of from 10 to 60 pounds per cubic foot.

The term polyol as employed in the present specification and claims refers to a triol or mixtures of the triols or to mixtures of triols and diols. In the present specification and claims, the term triol refers to secondary or primary capped triols having molecular weights of from 1500 to 6500 and the term diol refers to secondary or primary capped diols having molecular weights of from 400 to 2800. The mixture of triols and diols includes any combination of said primary and/or secondary triols and primary and/or secondary diols as long as the mixture contains a triol and a diol. Microcellular foams having optimum properties are obtained when the urethane formulations of the present invention contains a polyol mixture comprised of a primary capped triol having an average molecular weight of about 3000 and a secondary capped diol having an average molecular weight of about 1000. The lower molecular weight triols are employed in the production of hard or dense foams and the higher molecular weight diols are employed in the production of softer foams. When the microcellular foam composition of the present invention is employed in prepolymer or quasi-prepolymer processes, it is recommended that the catalyst portion of the system be diluted with polyol.

The terms "diol" and "triol" refer to dihydroxy and trihydroxy polyols, respectively. The diols and triols are condensation products formed by the polymerization of an organic oxide such as ethylene oxide, propylene oxide, 1,2-butylene oxide and the like and an initiator containing two active hydrogens in the case of the diols and three active hydrogens in the case of the triols. Representative initiators include the glycols such as ethylene glycol or propylene glycol, glycerine, trimethylol propane and organic amines having two or three active hydrogens.

The toluene diisocyanate employed in the present invention can either by an 80/20 mixture (80 percent, 2,4-toluene diisocyanate and 20 percent 2,6-toluene diisocyanate) or the 65/35 mixture or combinations thereof. The 80/20 mixture of isomers gives optimum reaction speed and produces a thick skinned material. When the 65/35 mixture is employed, the reaction proceeds more slowly; however, the use of the 65/35 mixture results in less shrinkage in the final microcellular foam material. The polyol, aromatic amine, propoxylated aniline and diisocyanate are employed in amounts sufficient to provide an NCO/active hydrogen ratio in the range of from 1:1 to 1.2:1 inclusive. When the NCO/active hydrogen ratio is below 1:1, the microcellular foams produced by such formulations do not dry after formation and as the NCO/active hydrogen ratio is increased above 1.2:1, the foams become hard and physical properties deteriorate. Good properties of the desired product are obtained when the isocyanate index (NCO to all active hydrogen) is between about 108 to 118 with the optimum properties being obtained when the isocyanate index is about 116.

The term "aromatic amine" as employed in the present invention designates an aromatic amine corresponding to the formula

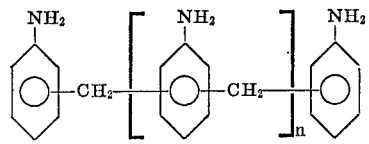    I wherein $n$ represents an average value of from about 0.1 to about 0.3 and the aromatic amine has an equivalent weight of from 90 to 105 and a functionality of from about 2.1 to about 2.3. The term "aromatic amine" as employed in the present specification and claims includes mixtures of the aromatic amine corresponding to Formula I. The aromatic amine functions as a curing agent and catalyst. The catalytic action of the aromatic amine is sufficient to obviate the necessity for employing a supplemental amine catalyst such as triethylene diamine. In the formulations of the present invention the aromatic amine is employed in quantities sufficient to produce an —$NH_2$ to hydroxyl ratio in the range of from 0.6:1 to 1:1, inclusive. Optimum properties of the present invention are obtained when the —$NH_2$ to hydroxyl ratio is between about 0.70:1 to 0.85:1.

In the present specification and claims, the propoxylated aniline corresponds to the formula

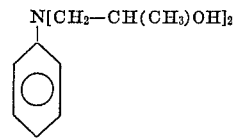

and has a hydroxyl number of 534 and a functionality of 2. In preparing the formulations of the present invention, the aromatic amine and propoxylated aniline are employed in amounts sufficient to provide an aromatic amine-propoxylated aniline mixture comprised of from about 95 to about 40 percent aromatic amine and from about 5 to about 60 percent by weight of the propoxylated aniline, i.e., the weight ratio of aromatic amine to the sum of aromatic amine and propoxylated anilines from 0.45:1.0 to 0.95:1.0. The use of greater than 95 percent of the aromatic amine causes a reaction which is too rapid to control whereas the use of less than 40 percent of the aromatic amine produces a foam composition which does not adequately rise and form integral skinned products. Foam compositions exhibiting optimum properties are produced when the aromatic amine-propoxylated aniline mixture is comprised of from about 75 to about 80 percent aromatic amine with the complementary portion being propoxylated aniline.

While the foaming reaction proceeds readily without the utilization of additional catalysts, it has been found that the use of a supplementary organometallic catalyst causes the reaction to proceed rapidly and produces a microcellular foam product having optimum desired physical properties. The use of supplementary catalysts also aid in the gelation of the foam composition. Representative organometallic catalysts include lead octoate, dibutyl tin dilaurate, tin octoate, cobalt octoate and the like. The supplementary catalysts, when employed, are utilized in an amount equivalent to from about 0.5 to about 3.5 percent by weight of the urethane formulation. The use of larger amounts of catalyst, particularly the lead catalyst, has been found to have deleterious effects on the foaming process due to the formation of a complex between the heavy metal ions and the ligands.

In the production of lower and medium density flexible microcellular foams, a blowing agent is added to the urethane formulation. The blowing agent is generally employed at a rate of from about 3 to about 10 percent by weight with respect to the total foamable urethane formulation. However, when producing high density microcellular foams, particularly those having a density of about 60 pounds per cubic foot, it is unnecessary to add a blowing agent as there is sufficient water present to react with the isocyanate to form small amounts of carbon dioxide which provide sufficient foaming. Representative blowing agents to be employed in the present formulations include the various Freons, methylene chloride and the like. It has been found convenient to employ methylene chloride in addition to any other blowing agent being employed. The methylene chloride decreases the amount of complexing between the heavy metal catalyst ion and the ligands as well as robbing some of the exothermic heat of reaction thereby slowing down the foaming process.

The foam composition of the present invention can also contain other additives such as flame retardants, pigments, reaction inhibitors, water scavengers, fillers and the like. The use of these additive materials is well known to those skilled in the art.

As previously stated, the urethane formulations are employed in a quasi-prepolymer, prepolymer or "one-shot" process. In the "one-shot" method, the various reactants are conveniently fed into the mixing head in several or more streams. However, "one-shot" processes employing the formulations of the present invention are difficult to carry out due to the speed of reaction. When it is desirable to employ a "one-shot" process and the speed of reaction is too rapid, the reaction can be slowed down by the addition of a reaction inhibitor to the urethane formulation; however, the use of a reaction inhibitor may have an undesirable effect on skin formation.

In the quasi-prepolymer of prepolymer method, the order of addition of the various components of the prepolymer is not important. In the preparation of the catalyst component, it has been found convenient to add the aromatic amine, propoxylated aniline and blowing agents to a mixture of the polyol and organometallic catalyst. The two components are then mixed together and the mixture added to the mold within a short time after mixing. The urethane composition is added either by injection, strip pouring or other convenient procedure. Due to the speed of the reaction, it is generally necessary to add the foamable urethane mixture to the mold within about 5 seconds after the components are admixed and to have the mold closed and secured within about 30 seconds after the components are admixed. While the reaction can be slowed somewhat by the addition of inhibitors or by varying the mixing temperatures, such variations do not give optimum skin formation.

The foam compositions can be added to any type of mold surface. However, the type of surface employed will affect the type of skin formation obtained. In a preferred procedure an epoxy of silicone rubber mold is employed as these molds do not readily conduct heat and, therefore, contribute to the establishment of a temperature differential between the surface of the mold and the exotherm of the foam. This temperature differential is essential to the production of a thick integral skin on the foamed product. While metal molds can be employed, the metal, being a better conductor of heat than either epoxy or silicone, conducts heat away from the mold surface and, therefore, does not allow as great a temperature differential to be established. Thus, the use of metal molds often results in the formation of a thin skin on the foamed object. In the production of foamed objects from the urethane formulations of the present invention, a mold temperature of from 75° to 150° F. is generally employed, with the foaming reaction generally being carried out within the mold for from 4 to 12 minutes. In a convenient procedure, the mold temperature at the time of addition of the urethane formulation is about 90° F. and the material remains in the closed mold for about 8 minutes. It is generally desirable that the skin have a thickness of from about 30 mils to about ⅛ inch; however, the skin thickness desired will depend on the ultimate use of the foamed product. At the lower mold temperature, care must be taken to eliminate air from being trapped in the mold and at the temperatures near 150° F. care must be exercised in order that the skin is not too porous. The foam generally becomes tack-free at the molding temperatures within from about 30 seconds to one minute and the foamed material can be handled without injury thereto as soon as it is removed from the mold. It is not necessary to heat cure the foamed products after they have been removed from the mold; however, if the foamed products are to be painted, it is recommended that they be heat cured to remove gases from the foam. Failure to heat cure before painting may cause bubbles in the painted surface. In a convenient procedure, the foamed products can be heated at 200° to 225° F. for about 1 hour.

SPECIFIC EMBODIMENTS

The following examples are merely illustrative and are not deemed to be limiting.

Example 1

In a quasi-prepolymer system the prepolymer is prepared as follows by mixing the following constituents in the order as given.

| Components: | Parts |
|---|---|
| Primary OH capped (1) triol (molecular weight 3000) | 82.1 |
| Toluene diisocyanate (80/20 mixture) | 35.8 |
| Benzoyl chloride | 0.36 |
| Titanium dioxide (50% dispersion in the triol) | [1] 9.1 |
| Carbon black (20% dispersion in the triol) | [1] 1.82 |
| Phosgard C-22-R (2) | 12.0 |

[1] Of dispersion.
(1), (2)—See notes at end of specification.

The catalyst is prepared by mixing together the following components in the order as given:

| Components: | Parts |
|---|---|
| Primary OH capped triol (molecular weight 3000) | 66.0 |
| Lead octoate (3) (24% Pb in mineral spirits) | 4.5 |
| Aromatic amine (4) | 16.3 |
| Propoxylated aniline (5) | 4.1 |
| Freon 11 (6) | 20.0 |
| Methylene chloride | 25.0 |

(3), (4), (5), (6)—See notes at end of specification.

The catalyst and prepolymer are mixed together at a temperature of 80° F. and added to a silicone mold at a rate of from 50 to 100 grams per second. Following the addition of the urethane composition to the mold, the mold is closed and maintained at a temperature of 100° F. for 8 minutes. Following the foaming period, the foamed material is removed, cured for 1 hour at 200° F. and tested for density, tensile strength, tear, elongation, compression set and compression deflection. The properties thus measured are set forth in Table 1. The foamed product was about ½ inch in thickness and had a ⅛ inch integral skin.

Example 2

Following the method set forth in Example 1, the following quasi-prepolymer system was prepared.

PREPOLYMER

| Components: | Parts |
|---|---|
| Primary OH capped triol (molecular weight 3000) | 62.1 |
| Toluene diisocyanate (80/20 mixture) | 35.8 |
| Phosgard C-22-R | 12.2 |
| Benzoyl chloride | 0.36 |
| Titanium dioxide (50% dispersion in the triol) | [1] 9.1 |
| Carbon black (20% dispersion in the triol) | [1] 1.82 |

[1] (Of dispersion.)

CATALYST

| Components: | Parts |
|---|---|
| Primary OH capped triol (molecular weight 3000) | 56.0 |
| Secondary OH capped diol (7) (molecular weight 1000) | 15.5 |
| Lead octoate (3) | 4.5 |
| Aromatic amine | 15.3 |
| Propoxylated aniline | 5.1 |
| Freon 11 | 10.0 |
| Methylene chloride | 25.0 |

(7), (3)—See notes at end of specification.

These materials were mixed at a temperature of 80° F. and added to a mold at a rate of 250 to 1000 grams per second. The mold temperature at the time of addition was 90° F. Following the addition of the urethane composition to the mold, the mold is closed and maintained at a temperature of 100° F. for 8 minutes. Following the molding period, the product was removed, cured for one hour at 225° F. and the physical properties of the cured material measured and set forth in Table 1. The 2½-inch thick product had a skin thickness of 3/16 inch.

Example 3

The following formulations were prepared and molded as described in Example 2.

| | Formulations, parts by weight of components | | | |
|---|---|---|---|---|
| | A | B | C | D |
| Catalyst: | | | | |
| Primary OH capped triol (molecular weight 3,000) | 62.4 | 56.0 | 56.0 | 56.0 |
| Aromatic amine | 19.3 | 15.3 | 15.3 | 15.3 |
| Propoxylated aniline | 1.1 | 5.1 | 5.1 | 5.1 |
| Freon 11 | 10.0 | 10.0 | 10.0 | 10.0 |
| Methylene chloride | 25.0 | 25.0 | 25.0 | 25.0 |
| Lead octoate (3) | 4.5 | 4.5 | 4.5 | 4.5 |
| Carbon black (20% dispersion in triol) | 26.93 | 0.0 | 0.0 | 0.0 |
| Prepolymer: | | | | |
| Primary OH capped triol (molecular weight 3,000) | 62.1 | 40.6 | 40.6 | 40.6 |
| Secondary OH capped diol (molecular weight 1,000) | 15.5 | 15.5 | 15.5 | 15.5 |
| TDI (80/20 mixture) | 35.8 | 31.5 | 33.0 | 34.5 |
| Benzoyl chloride | 0.36 | 0.36 | 0.36 | 0.36 |
| Carbon black (20% dispersion in triol) | 0.0 | 26.93 | 26.93 | 26.93 |

(3)—See notes at end of specification.

Example 4

The following materials were employed in a prepolymer process to prepare a formulation which produced a foam having a free-blown density of about 45 pounds per cubic foot.

CATALYST

| Components: | Parts |
|---|---|
| Secondary capped triol (8) (molecular weight 3000) | 28.0 |
| Primary OH capped triol (molecular weight 3000) | 28.0 |
| Primary OH capped diol (9) (molecular weight 1,100) | 16.1 |
| Aromatic amine | 8.16 |
| Propolylated aniline | 12.24 |
| Dibutyl tin dilaurate (10) | 2.0 |
| Methylene chloride | 25.0 |
| Freon II | 20.0 |

PREPOLYMER

| | Parts |
|---|---|
| Primary OH capper triol (molecular weight 3000) | 62.1 |
| TDI (80/20 mixture) | 35.8 |
| Phosgard C-22-R | 12.2 |
| Benzoyl chloride | 0.36 |
| Titanium dioxide (50% dispersion in the triol) | 9.1 |
| Carbon black (20% dispersion in the triol) | 1.81 |

(8), (9), (10)—See notes at end of specification.

The following commercially available materials were employed in the formulations of the present invention. It is understood that other materials falling within the definitions set forth in the present specification and claims can be and have been substituted for the listed commercial products. Such substitutions of equivalents does not depart from the present invention.

NOTES (1) CP-3001—a 3000 molecular weight polyether triol of alkylene oxides with some primary hydroxyls sold by The Dow Chemical Company under the registered trademark Voranol.

(2) The trademark for a flame retardant organophosphorus compound with high efficiency through high phosphorus and chlorine content sold by The Monsanto Co.

(3) 24 percent Pb in mineral spirits—Tenneco Chemicals, Inc.

(4) Curithane 103 (equivalent weight 103, functionality 2.3)—Upjohn Co., Polymer Chemicals Division—This can be replaced with Curithane 90 (a mixture of aromatic amines as herein defined having equivalent weigths of 103 and 93 wherein the functionality of the mixture is about 2.2) in accordance with the teachings of the present invention.

(5) Isonol-C-100—the trademark for N,N-(2-hydroxypropyl)aniline sold by Upjohn Co., Polymer Chemicals Division (6) Trichlorofluoromethane — E. I. du Pont de Nemours & Co.

(7) P-1010—Pluracol®—the trademark for a 1000 molecular weight diol consisting of a polyoxypropylene

TABLE I

| Material prepared in in Example No.— | Density (pounds/ft.³) | Tensile strength (p.s.i.) | Tear strength (pounds/in.) | Elongation (percent) | Percent compression set [1] | Compression deflection (50%, p.s.i.) |
|---|---|---|---|---|---|---|
| 1 | 20.0 | 166 | 5.7 | 93 | 15.3 | 5.2 |
| 2 | 45.0 | 475 | 106.0 | 120 | 18.2 | 613.0 |
| 3(A) | 54.5 | 645 | 100.0 | 95 | 42.8 | 1,184.0 |
| 3(B) | 40.3 | 444 | 74.0 | 93 | 22.6 | 784.0 |
| 3(C) | 35.5 | 496 | 82.3 | 90 | 27.6 | 912.0 |
| 3(D) | 46.0 | 640 | 111.3 | 83 | 48.5 | 1,736.0 |

[1] ASTM test D-1564-58, Method B—Results expressed as percent of the original height of the sample which did not recover in 30 minutes after sample had been compressed to ½ original height for a period of 22 hours at 158° F.

derivative of propylene glycols sold by Wyandotte Chemicals Corp.

(8) GP-3030—Pluracol®—the trademark for the 3000 molecular weight triol consisting of polyoxyproplene derivatives of glycerol and sold by Wyandotte Chemicals Corp.

(9) L-31 Pluronic®—the trademark for difunctional polyoxyalkaylene derivatives of propylene glycol terminating in primary hydroxyl groups and having a molecular weight of 1151 sold by Wyandotte Chemicals Corp.

(10) T-12—M&T Chemicals

We claim:

1. A microcellular polyurethane foam having a density of 10 to 60 pounds per cubic foot prepared by reacting in the presence of an organometallic catalyst and in the presence of a blowing agent or sufficient water to produce a small amount of carbon dioxide:

(1) toluene diisocyanate;
(2) a polyol selected from the group consisting of:
   (A) organic triols having molecular weights of from about 1,500 to about 6,500 and
   (B) mixtures of (I) organic triols having molecular weights of from about 1,500 to about 6,500 and (II) organic diols having molecular weights of from about 400 to about 2,800;
(3) an aromatic having the formula:

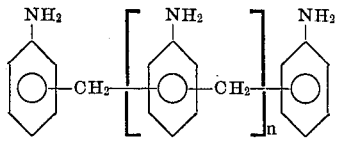

wherein $n$ equals from about 0.1 to about 0.3; and
(4) a propoxylated aniline having the formula:

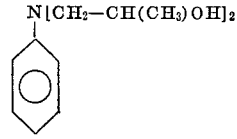

proportions of (1) to (2) to (3) to (4) being such that:
   (a) the ratio of —NCO to active hydrogen atoms is in the range of from 1.0:1.0 to 1.2:1.0;
   (b) the ratio of —NH$_2$ groups of the aromatic amine to —OH groups is in the range of from 0.6:1.0 to 1.0:1.0; and
   (c) the weight ratio of aromatic amine to the sum of aromatic amine and propoxylated aniline is from 0.45:1.0 to 0.95:1.0, 2. The microcellular polyurethane foam claimed in claim 1 wherein the aromatic amine corresponds to the formula

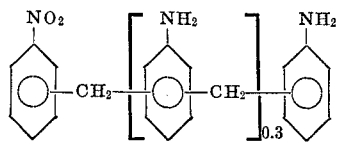

References Cited

UNITED STATES PATENTS

| | | |
|---|---|---|
| 2,955,091 | 10/1960 | Kane. |
| 3,194,793 | 7/1965 | Kogon _____ 260—77.5 |
| 3,348,963 | 10/1967 | Fukushima et al. _____ 117—63 |
| 3,450,653 | 6/1969 | McClellan _____ 260—18 |
| 3,475,266 | 10/1969 | Strassel _____ 161—190 |

FOREIGN PATENTS

| | | |
|---|---|---|
| 1,438,004 | 3/1966 | France _____ 260—2.5 |
| 1,120,425 | 7/1968 | Great Britain ____ 260—2.5UX |

OTHER REFERENCES

Dutch patent specification publication No. 6,509,819 (1966), 11 pages.

Product Bulletin "Isonol C-100" of The Upjohn Co. (1 page), published Sept. 1, 1966.

Product Bulletin "Curithane 103" of The Upjohn Co. (1 page), published July 15, 1966.

DONALD E. CZAJA, Primary Examiner

H. S. COCKERAM, Assistant Examiner

U.S. Cl. X.R.

260—77.5